July 5, 1932.   S. LAFLEUR   1,865,865
HYDRAULIC SHOCK ABSORBER
Filed Nov. 19, 1928
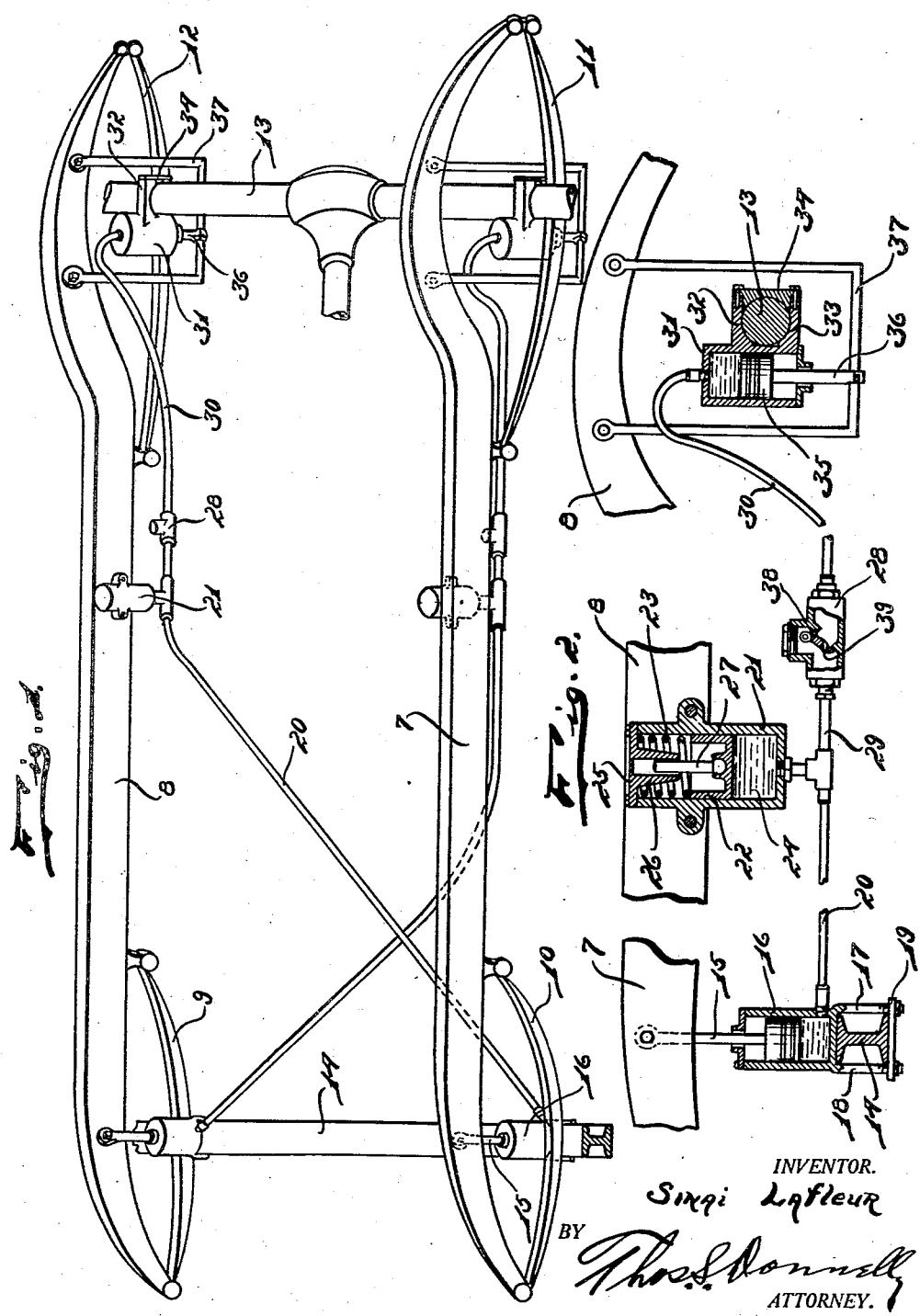
INVENTOR.
Simqi Lafleur
BY
Thos. S. Donnelly
ATTORNEY.

Patented July 5, 1932

1,865,865

UNITED STATES PATENT OFFICE

SINAI LAFLEUR, OF DETROIT, MICHIGAN

HYDRAULIC SHOCK ABSORBER

Application filed November 19, 1928. Serial No. 320,265.

My invention relates to a new and useful improvement in an hydraulic shock absorber adapted for use on vehicles.

It is an object of the present invention to provide a shock absorber which will serve to stabilize the vehicle and distribute the shock transmitted at the vehicle when passing over rough places.

Another object of the invention is the provision in a shock absorber of an hydraulically controlled means for resisting relative displacement of various parts of the vehicle and restoring them quickly to normal position when displaced.

Another object of the invention is the provision in a shock absorber system of this class of a master cylinder for controlling the operation.

Other objects will appear hereinafter.

The invention consists in the combination and arrangement of parts hereinafter described and claimed.

The invention will be best understood from a reference to the accompanying drawing which forms a part of this specification and in which, Fig. 1 is a perspective view of the invention applied.

Fig. 2 is a sectional view in fragment of the invention.

In the drawing I have illustrated the invention operated hydraulically but from the description it will also appear that the invention may be pneumatically operated if desired. The invention is illustrated as applied to a vehicle having a chassis comprising side rails 7 and 8 to which are attached springs 9, 10 and 11, and 12 cooperating with the axles 13 and 14, for supporting the chassis frame. A piston rod 15 is connected to the chassis rail 7 or 8, as the case may be, adjacent the forward end of the vehicle and extends into a cylinder 16 formed on which are spaced bolts 17 and 18 cooperating with the cross bar 19 for securing the piston on the axle 14. The mounting and structure of the device at opposite sides of the chassis frame is the same so that a description of one side will suffice for both. The pipe 20 serves to connect the cylinder 16 in communication with the master cylinder 21 which is mounted on the chassis rail 7 or 8, as the case may be. A piston 22 is mounted in the cylinder 21 and normally pressed by the spring 23 against the fluid 24 which fills the system. A cap 25 is provided with a guide 26 about which is positioned, in embracing relation, the spring 23 and in which engages the guide rod 27 of the piston 22. A check valve having a barrel 28 connects with the pipe 29 and by the pipe 30 with the cylinder 31, which is provided with the yoke arms 32 which embrace the axle 13 and held in position by the cap 34. A piston 35 is slidably mounted in the cylinder 31 and connected to a piston rod 36 which connects to the bight of the U-bolt 37 which is connected to the chassis rail 8 or 7, as the case may be. It will be noted that the cylinder 16 is diagonally opposite to the cylinder 31 with which it cooperates so that if a displacement of one corner of the vehicle is effected, the shock is distributed to the diagonally opposite corner and a corresponding displacement effected to overcome the undue displacement.

With a system such as described installed on a vehicle, a shock transmitted to any corner of the vehicle is resisted by the fluid in the system and distributed across the chassis of the vehicle to the diagonally opposite side. In the cylinder 28 is a swingably mounted check member 38 having bleed openings 39 formed therein so that the shock from the forward corner is also taken up in the master cylinder 21 which serves to maintain the fluid pressure in the cylinder at the proper pressure at all times.

While I have illustrated and described the preferred form of my invention, I do not wish to limit myself to the precise details of structure shown but desire to avail myself of such variations and modifications as come within the scope of the appended claims.

Having thus described my invention what I claim as new and desire to secure by Letters Patent is:

1. A shock absorber of the class described adapted for use with a vehicle having a chassis and axles extending transversely thereof at opposite ends of the chassis comprising: a plurality of cylinders, each mounted on one of said axles on the end thereof; a piston in each of said cylinders; a piston rod connected to each of said pistons; means for connecting said piston rod to said chassis, the piston rods at diagonally opposite sides of said chassis projecting oppositely outwardly from said cylinders; and means for communicating the upper side of one of said cylinders with the lower side of the lower diagonally opposite cylinder.

2. A shock absorber of the class described adapted for use with a vehicle having a chassis and axles extending transversely thereof at opposite ends of the chassis comprising: a plurality of cylinders, each mounted on one of said axles on the end thereof; a piston in each of said cylinders; a piston rod connected to each of said pistons; means for connecting said piston rod to said chassis, the piston rods at diagonally opposite sides of said chassis projecting oppositely outwardly from said cylinders; means for communicating the upper side of one of said cylinders with the lower side of the lower diagonally opposite cylinder; an intermediary cylinder connected to said chassis; a piston mounted in said intermediary cylinder; and means for connecting the interior of said cylinder with said connecting means.

3. A shock absorber of the class described adapted for use with a vehicle having a chassis and axles extending transversely thereof at opposite ends of the chassis comprising: a plurality of cylinders, each mounted on one of said axles on the end thereof; a piston in each of said cylinders; a piston rod connected to each of said pistons; means for connecting said piston rod to said chassis, the piston rods at diagonally opposite sides of said chassis projecting oppositely outwardly from said cylinders; means for communicating the upper side of one of said cylinders with the lower side of the lower diagonally opposite cylinder; an intermediary cylinder connected to said chassis; a piston mounted in said intermediary cylinder; means for connecting the interior of said cylinder with said connecting means; and a check valve in said connecting means for retarding the flow of fluid therethrough in one direction.

In testimony whereof I have signed the foregoing specification.

SINAI LAFLEUR.